United States Patent [19]

Stowell et al.

[11] 4,198,318

[45] Apr. 15, 1980

[54] PRODUCTION OF HIGH STRENGTH ALUMINA SPHERES BY HYDROGELLING CORRESPONDING SLURRIES

[75] Inventors: Donald E. Stowell, Oklahoma City; R. Tom Jackson; Larry L. Bendig, both of Ponca City, all of Okla.

[73] Assignee: Conoco, Inc., Ponca City, Okla.

[21] Appl. No.: 963,594

[22] Filed: Nov. 24, 1978

[51] Int. Cl.$^2$ .................. B01J 21/04; B01J 35/08; C01F 7/02
[52] U.S. Cl. .................................. 252/448; 252/463; 423/626
[58] Field of Search ............... 252/448, 463; 423/626, 423/628, 630, 631

[56] References Cited

U.S. PATENT DOCUMENTS

| | | | |
|---|---|---|---|
| 2,492,808 | 12/1949 | Marisil et al. | 252/448 |
| 4,066,740 | 1/1978 | Erickson | 423/628 |
| 4,116,882 | 9/1978 | Bendig et al. | 252/448 |

*Primary Examiner*—P. E. Konopka
*Attorney, Agent, or Firm*—Cortlan R. Schupbach, Jr.

[57] ABSTRACT

Alumina spheres having high crush strength are produced by hydrogelling low viscosity acidified alumina slurries in a surfactant-containing ammonia solution, said slurries being inserted into the ammonia solution dropwise.

9 Claims, No Drawings

PRODUCTION OF HIGH STRENGTH ALUMINA SPHERES BY HYDROGELLING CORRESPONDING SLURRIES

This invention relates to an improved method for forming alumina spheres. More particularly, this invention relates to an improved method for forming alumina spheres by eliminating currently practiced two-phase columns while providing an alumina sphere with good activity and high crush strength.

Formation of alumina spheres by dropping an aluminum salt through a hydrocarbon filled column is known and has been practiced for several years. Many references are found in this area but the art is adequately represented by several U.S. Patents. U.S. Pat. No. 2,620,314 teaches mixing an alumina sol with a weak base such as hexamethylene tetraamine, dropping the mixture through a hydrocarbon bath and ageing the materials. U.S. Pat. No. 3,346,336 eliminates the use of a gelling agent (such as an aqueous ammonia phase) by adding an acidic $Al_2O_3$ hydrosol to an equal volume of an alkali metal hydroxide, then passing the mixture through a hydrocarbon filled column to obtain spheriods. The hydrosol was prepared by dissolving aluminum metal in concentrated hydrochloric acid, which leaves chlorine ions in the alumina at the end of the process. Another such process is taught in U.S. Pat. No. 3,027,234.

U.S. Pat. No. 3,096,295 uses hexamethylene tetraamine to set the hydrogel. Other references use chloride or sulfate ions for processing purposes which remain in the alumina and are unsatisfactory for many catalytic purposes. Examples of such references are U.S. Pat. Nos. 3,027,234; 3,600,129; 3,943,071. U.S. Pat. No. 3,979,334 teaches using a chemical containing an ammonia precursor to eliminate the need for an aqueous ammonia phase to age the spheres. U.S. Pat. No. 4,116,882 teaches a method for forming alumina spheres by peptizing slurries, ageing and dropping the slurries through a hydrocarbon filled column to avoid drying and slurring the ammonia powder.

Thus it can be seen that it would be very desirable to provide a method whereby alumina spheres could be produced without the necessity of using hydrocarbon filled columns with subsequent processing steps while providing alumina spheres containing no detrimental ions.

It is therefore an object of the instant invention to provide an improved process for producing alumina spheres having high crush strength while reducing the use of hydrocarbon oils in the formation column. Other objects will become apparent to those skilled in this art as the description proceeds.

It has now been discovered that substantially spherical alumina having high crush strength can be obtained from a method comprising dropping low viscosity acidified alumina slurry directly into an ammonia solution containing surfactants. As the spheres formed fall through the ammonia, they harden or set sufficiently to maintain spherical form. The alumina spheres formed normally have pore volumes in the range of from about 35 to about 65 angstroms (after calcining 3 hours at 900° F.) and the alumina slurry normally contains from about 7 to about 15 weight percent $Al_2O_3$ prior to dropping through the column. The agent used to peptize the slurry is an acid which does not leave deleterious ions in the slurry such as acetic acid, nitric acid, and formic acid. At the conclusion of the recovery and drying of the spheres, the spheres can be calcined to convert the alumina to the gamma form if desired.

Alumina spheres have previously been formed by the controlled contacting of an alumina powder in a peptizing mist on a rotating disc such as the Dravo wheel (made and sold by Dravo Manufacturing Corporation); also by the dropwise addition of alumina slurries into an oil/aqueous ammonia two phase system; and by rounding out equal length green extrudates on a higher speed rotating wheel. The addition of alumina to a two phase system in the past has required a lower aqueous phase containing a basic material such as ammonia and an upper phase consisting of an immiscible oil or related hydrophobes. In the prior art the upper oil layer has served as a forming medium where the high interfacial tension forces the slurry droplet to assume a substantially spherical configuration. The lower basic phase then served as the setting medium by converting the slurry droplet to a hydrogel sufficiently rigid to allow for subsequent processing and drying while remaining substantially spherical.

The instant invention simply forms substantially spherical alumina particles by the dropwise addition of low viscosity, acidified alumina slurries to an ammonia solution containing surfactant. The instant invention avoids the hydrocarbon costs and the complications of the two phase oil/aqueous systems of the prior art, since the product alumina spheres contain no oil contaminant after forming. The spheres are characterized by very high crush strength.

Normally in the practice of the instant invention, the viscosity of the slurry will range from about 5 to about 250 centipoise, but normally will be in the range of from about 5 to about 100 centipoise. The slurry is normally acidified at a level of from about 0.1 to about 2.5% based on the weight of the slurry. The final slurry would thus have an $Al_2O_3$ content of from about 5 to about 20 weight percent alumina, and more normally will have an $Al_2O_3$ content of from about 7 to about 15 weight percent.

The surfactants useful in the process of the instant invention are preferably non-ionic surfactants since they leave no deleterious ions behind in the finished alumina. However, ionic surfactants can be used if they contain no deleterious ions which would remain in the alumina. Representative examples of appropriate surfactants are alcohol ethoxylates, alkyl phenol ethoxylates, ethoxylated fatty acids, ammonium ether sulfates, and ammonium alcohol sulfates.

It is preferred that the alumina used in the practice of the instant invention be derived from the hydrolysis of aluminum alkoxides, although it is well known that alumina from other sources can be used.

Alumina alkoxides suitable for use in the method of the present invention are those aluminum alkoxides wherein the alkoxy groups contain from 2 to 30 carbon atoms each. Suitable aluminum alkoxides are produced by a process such as the Ziegler process. The preparation of such aluminum alkoxides is well known to those skilled in this art. For example, in many instances, the aluminum alkoxides are produced for the purpose of producing alumina or alcohols. In any event, it is desirable that the alcohols be recovered as such since they constitute a valuable co-product of the reaction. Some suitable alkoxide mixtures such as those produced by the Ziegler process may contain minor amounts of alkoxy groups containing less than 4 carbon atoms. Alcohols produced by the Ziegler process will contain only alkoxy groups having an even number of carbon atoms.

Such aluminum alkoxides are then contacted with an excess of water to form alumina and alcohols containing from about 2 to about 30 carbon atoms. The alumina is a solid which is largely immiscible in water and precipitates; thereby facilitating recovery. The alcohols are readily separated by decanting and the like. If desired, organic diluents can be used in order to more readily separate the recovered alcohols from the precipitated alumina.

The alumina is then normally steam stripped to remove any alcohol impurities. Normally, at this point, the alumina is dired and reduced to a convenient size prior to forming operation, such as extrusion, spheroidization on a rotating disc, or reslurrying and dropping through a hydrocarbon/ammonia column.

In the instant invention, the steam stripped slurry can be acidified with a peptizing acid, or filtered (centrifuged) and reslurried with the peptizing acid under agitation. when the acidified slurry is in the desired viscosity range (5 to 250 cp), it is dropped through the ammonia column containing sufficient surfactant. The spheres are then allowed to age for a sufficient period of time, usually for approximately a half hour in the ammonia solution at the bottom of the column, after which they are removed, dried overnight at about 250° F. and calcined for a desired period of time. Calcination at 900° F. or higher converts alumina to the gamma phase. Pore diameters of between about 35 and 65 anstroms can be achieved by having a calcination at 900° F. for 3 hours. As is known to those skilled in this art, higher temperatures increase pore sizes.

Normal ageing time in the ammonia/surfactant solution can range from about 5 minutes to about 1 hour with from about 15 to about 45 minutes being preferred. After recovery from the ammonia, free water must be removed. Normally, this is done by drying at less than 250° F. for sufficient time to remove the water. Calcination is carried out at temperatures of from 900° F. to about 1500° F. for a period of time sufficient to yield the desired average pore diameter.

In order for the present invention to operate satisfactorily, several conditions must be satisified.

First, the surfactant is added to the aqueous ammonia solution to reduce surface tension, allowing the slurry droplet to enter the setting solution with a minimum of mechanical deformation. If surfactant is not added, the product is very poorly shaped and inconsistent. Shaping of the product has, in the prior art, been carried out in a hydrocarbon portion of a two-phase column. Such hydrocarbon systems are not necessary under the process of the present invention.

The nozzle which is used to form alumina slurry drops for insertion into the setting solution must be held as close to the setting solution surface as possible, consistant with obtaining a spherical shape prior to entering the ammonia. The minimum height the nozzle is held above the surface is dictated by hydrogelling of the droplet before it is completely detached from the end of the nozzle, which would result in an irregularly formed particle. The maximum height the nozzle is held above the solution surface is dictated by the deformation which occurs if the droplet contacts the ammonia/surfactant surface at a relatively high velocity. Droplets which are formed at elevated heights are shaped like cups, whereas droplets which enter from heights too close to the surface tend to be flattened or oblong. In experimental studies, it has been found that the optimum height ranges from about 0.5 centimeters to about 2 centimeters. It is therefore apparent that the nozzle height is very important.

Droplet size also has a bearing upon the height from which the droplet will be formed. Larger droplets need sufficient time to obtain spherical shape before encountering the aqueous ammonia/surfactant liquid. Simple experimentation will determine the proper drop size and drop height for optimum, substantially spherical particles.

Finally, slurries with low viscosities are used to produce particles with substantially spherical shapes. Slurries with high viscosities are less susceptible to surface tension forces but do not form well in the very short amount of time defined by detachment from the nozzle to collision with the setting solution. Thus, highly concentrated alumina gels and related materials are precluded from the instant invention. Alumina-containing solutions derived by the addition of acid to corresponding slurries (derived from the hydrolysis of aluminum alkoxides) are highly preferred for this reason. Slurries derived from powder are less preferred, but under strict conditions are operable in the process of the instant invention.

The invention is more conceretely described with reference to the examples below wherein all parts and percentages are by weight unless otherwise specified. The examples are provided to exemplify the instant invention and not to limit it.

EXAMPLE 1

An alumina slurry derived from the hydrolysis of aluminum alkoxides containing 8.2% $Al_2O_3$ by weight was agitated. To the agitated mixture, 6.2 ml of nitric acid solution (prepared by mixing 50 ml of distilled water and 50 ml of 70 weight percent nitric acid reagent) was added. After mixing for several minutes, the mixture was dropped by a syringe into an aqueous solution from a height of 1.5 centimeters. The solution contains 6 weight percent ammonia and 0.5 weight percent non-ionic surfactant (ALFONIC 14-12/60 alcohol ethoxylate, trademark of and sold by Continental Oil Company.)

EXAMPLE 2

The alumina slurry described in Example 1 (200 ml) was used. The acid solution described in Example 1 (7.8 ml) was mixed into the slurry. The resulting solution was dropped into an ammonia bath as described in Example 1 from approximately 1.5 centimeters above the surface.

EXAMPLE 3

A comparative example was carried out using alumina powder made from the same slurry as described in Examples 1 and 2. The powder was dropped onto a rotating wheel under an atomizing mist of peptizing reagent such as described in Examples 1 or 2. The wheel was operated until spheres had been formed.

Table 1 shows a comparison of Examples 1, 2, and 3 with regard to average diameter of the spheres, inherent crush strength, pounds crush strength, and accumulative pore volume as determined by the mercury penetration technique using pressures up to about 50,000 pounds per square inch gauge (psig). The pore volume tests were preformed on a mercury porosimeter Model 905-1, manufactured by Micromeritics Corporation of Norcross, Ga., U.S.A.

Table 1

| COMPARISON OF SPHERE PROPERTIES | | | |
|---|---|---|---|
| | | Spheres Produced Using Surfactant Ammonia | |
| | Rotating Wheel | Example | Example |
| Property | Spheres | #1 | #2 |
| Crush Strength, Lbs | 6.8 | 9.4 | 30.2 |
| Average Diameter, in | .07687 | .0563 | .0902 |
| Inherent Crush Strength, lbs/in | 88.4 | 167.0 | 334.8 |
| Cumulative Mercury Pore Volume, cc/gm | | | |
| 35–50A | .162 | .372 | .357 |
| 35–100 | .392 | .374 | .359 |
| 35–250 | .401 | .379 | .359 |
| 35–500 | .402 | .385 | .362 |
| 35–1000 | .404 | .395 | .362 |
| 35–10,000 | .424 | .395 | .362 |

Inherent crush strength in Table 1 reflects the diameter-normalized strength (inherent crush strength) of alumina spheres (crush strength divided by sphere diameter). Crush strength in pounds is an average value of several samples.

While certain embodiments and details have been shown for the purpose of illustrating this invention, it will be apparent to those skilled in this art that various changes and modifications may be made herein without departing from the spirit or scope of the invention.

We claim:

1. A method for producing alumina having high crush strength and substantially spherical shape comprising dropping low viscosity acidified alumina slurry directly into an ammonia solution containing surfactant.

2. A method as described in claim 1 wherein the viscosity of the slurry is from about 5 to about 250 centipoise.

3. A method as described in claim 2 wherein the alumina is acidified at a level of from about 0.1 to about 2.5 weight percent based on the weight of the slurry.

4. A method as described in claim 3 wherein the acid is selected from the group consisting of acetic acid, nitric acid, and formic acid, or mixtures of these.

5. A method as described in claim 2 wherein the surfactant is a non-ionic surfactant.

6. A method as described in claim 5 wherein the non-ionic surfactants are alcohol ethoxylates of $C_{10}$ to $C_{14}$ alcohols.

7. A method as described in claim 6 wherein the alumina obtained is substantially spherical in shape and the slurry is inserted into the surfactant containing ammonia solution of from a height of from about 0.5 to about 2 centimeters.

8. A method as described in claim 7 wherein the ammonia concentration in the column ranges from about 2.5 to about 10% by weight.

9. A method as described in claim 8 wherein an ionic surfactant is used containing no ions deleterious to the final alumina use.

* * * * *